United States Patent
Park et al.

(10) Patent No.: US 10,518,747 B2
(45) Date of Patent: Dec. 31, 2019

(54) SYSTEM, APPARATUS AND METHOD FOR CONTROLLING INLET OF ELECTRIC CAR

(71) Applicant: YURA CORPORATION CO.,LTD., Seongnam-si, Gyeonggi-do (KR)

(72) Inventors: Chan-hyun Park, Seoul (KR); Chang-jae Hwang, Ansan-si (KR)

(73) Assignee: YURA CORPORATION CO., LTD. (KR)

( * ) Notice: Subject to any disclaimer, the term of this patent is extended or adjusted under 35 U.S.C. 154(b) by 0 days.

(21) Appl. No.: 16/062,444

(22) PCT Filed: Dec. 19, 2016

(86) PCT No.: PCT/KR2016/014896
§ 371 (c)(1),
(2) Date: Jun. 14, 2018

(87) PCT Pub. No.: WO2017/105159
PCT Pub. Date: Jun. 22, 2017

(65) Prior Publication Data
US 2018/0354459 A1    Dec. 13, 2018

(30) Foreign Application Priority Data
Dec. 17, 2015    (KR) .................. 10-2015-0180973

(51) Int. Cl.
*B60R 25/24*    (2013.01)
*B60L 11/18*    (2006.01)
(Continued)

(52) U.S. Cl.
CPC .............. *B60R 25/24* (2013.01); *B60L 50/50* (2019.02); *B60L 53/14* (2019.02); *B60L 53/18* (2019.02);
(Continued)

(58) Field of Classification Search
CPC ..... B60R 25/24; B60L 50/50; G07C 9/00119; G07C 9/00182; B60K 6/22
See application file for complete search history.

(56) References Cited

U.S. PATENT DOCUMENTS 8,647,134 B2 *  2/2014  Schulte .............. H01R 13/6397
                                                   439/304
8,823,486 B2    9/2014  Jung et al.
(Continued)

FOREIGN PATENT DOCUMENTS

JP    2014204494 A    10/2014
JP    5812186 B2      11/2015
(Continued)

OTHER PUBLICATIONS

International Search Report and Written Opinion issued in PCT/KR2016/014896, dated Mar. 28, 2017; ISA/KR.

*Primary Examiner* — Thomas D Alunkal
(74) *Attorney, Agent, or Firm* — Harness, Dickey & Pierce, P.L.C.

(57) ABSTRACT

The present disclosure provides an inlet control system and apparatus for an electric vehicle. It is an object of the present disclosure to provide an inlet control system and apparatus for an electric vehicle that permit the connector of the charging cable to be released from the inlet of the electric vehicle connected thereto only when an authorized user having a release control apparatus is adjacent to the electric vehicle regardless of whether one end of the charging cable connected to a power source is removed or not and prohibit release of the connector of the charging cable from the inlet of the electric vehicle when the user having the release control apparatus moves away from the electric vehicle.

10 Claims, 5 Drawing Sheets

(51) Int. Cl.
*G07C 9/00* (2006.01)
*B60L 50/50* (2019.01)
*B60L 53/14* (2019.01)
*B60L 53/18* (2019.01)
*B60K 6/22* (2007.10)

(52) U.S. Cl.
CPC ...... *G07C 9/00119* (2013.01); *G07C 9/00182* (2013.01); *B60K 6/22* (2013.01); *B60L 2270/30* (2013.01); *B60Y 2200/91* (2013.01); *B60Y 2200/92* (2013.01); *G07C 2009/00261* (2013.01); *Y02T 10/7005* (2013.01); *Y02T 90/14* (2013.01)

(56) References Cited

U.S. PATENT DOCUMENTS

| | | | | |
|---|---|---|---|---|
| 2010/0230197 A1* | 9/2010 | Ortmann | ............ | B62D 15/0285 180/168 |
| 2011/0022222 A1* | 1/2011 | Tonegawa | ............... | B60L 8/003 700/232 |
| 2011/0241824 A1* | 10/2011 | Uesugi | .................... | B60L 53/65 340/5.8 |
| 2012/0071017 A1* | 3/2012 | Gaul | ....................... | B60L 53/60 439/304 |
| 2012/0139695 A1* | 6/2012 | Jung | ....................... | B60L 53/16 340/5.6 |
| 2013/0002188 A1* | 1/2013 | Uyeki | ................... | H01M 10/44 320/101 |
| 2013/0069589 A1 | 3/2013 | Kai et al. | | |
| 2015/0329002 A1* | 11/2015 | Broecker | ................ | B60L 53/65 320/109 |

FOREIGN PATENT DOCUMENTS

| | | |
|---|---|---|
| KR | 20120060640 A | 6/2012 |
| KR | 101385610 B1 | 4/2014 |
| WO | WO-2013137029 A1 | 9/2013 |

* cited by examiner

SYSTEM, APPARATUS AND METHOD FOR CONTROLLING INLET OF ELECTRIC CAR

CROSS REFERENCE TO RELATED APPLICATIONS

This application is a U.S. National Phase Application under 35 U.S.C. 371 of International Application No. PCT/KR2016/014896 filed on Dec. 19, 2016 and published in Korean as WO 2017/105159 A1 on Jun. 22, 2017. This application claims the benefit of priority from Korean Patent Application No. 10-2015-0180973 filed Dec. 17, 2015. The entire disclosures of all of the above applications are incorporated herein by reference.

TECHNICAL FIELD

The present disclosure relates to an inlet control system and apparatus for an electric vehicle, and more particularly, to a system and an apparatus for controlling an inlet of an electric vehicle and release of a connector of a charging cable from the inlet of the electric vehicle connected thereto.

BACKGROUND ART

The statements in this section merely provide background information on the present disclosure and do not necessarily constitute the prior art.

FIG. 1 is a view showing a conventional electric vehicle charging system.

Referring to FIG. 1, a conventional electric vehicle charging system includes a charging cable 110, an electric vehicle charging cable control apparatus 116, a power source 120, and an electric vehicle 130.

For recent electric vehicles (or plug-in hybrid electric vehicles) 130, the battery of the vehicle can be charged even at home using the charging cable 110.

The electric vehicle charging cable control apparatus 116 is positioned in the charging cable. When the battery of the electric car 130 is charged, the electric vehicle charging cable control apparatus 116 serves to supply or cut off electric power to or from the electric vehicle depending on circumstances.

In addition, the electric vehicle charging cable controller 116 serves to provide the vehicle with information such as whether charging is currently in progress, whether electric power transmission is interrupted in the event of a fault during charging, the current charging level, and a future chargeable capacity. The electric vehicle charging cable control apparatus 116 may also be referred to as an in-cable control box (ICCB).

While the charging cable 110 is illustrated in FIG. 1 as including the electric vehicle charging cable control apparatus 116, the electric vehicle charging system is not limited thereto. The electric vehicle charging system may be configured with a charging cable that does not have the electric vehicle charging cable control apparatus 116.

In the case of the conventional charging cable, one end of the charging cable is implemented as a plug and connected to a power source, and the other end of the charging cable is implemented as a connector and connected to an inlet of the electric vehicle. When the connector of the charging cable is connected to the inlet of the electric vehicle, an actuator inside the inlet of the electric vehicle operates to prevent release of the connector of the charging cable. Further, when the one end of the charging cable is removed from the power source, the actuator inside the inlet of the electric vehicle operates to permit release of the connector of the charging cable.

When the electric vehicle is charged at a low speed by a household power source, a long charging time of about 8 to 10 hours is required. Thus, after connecting the electric vehicle and the charging cable, the owner will leave in most cases. Considering that release of the connector of the charging cable is permitted once the plug of the charging cable is removed from the power source and that the user is very likely to leave the place due to a long time required for charging, the conventional charging cable or electric vehicle charging cable control apparatus is very vulnerable to theft.

DISCLOSURE

Technical Problem

It is an object of the present disclosure to provide an inlet control system and apparatus for an electric vehicle that permit the connector of the charging cable to be released from the inlet of the electric vehicle connected thereto only when an authorized user having a release control apparatus is adjacent to the electric vehicle regardless of whether one end of the charging cable connected to a power source is removed or not and prohibit release of the connector of the charging cable from the inlet of the electric vehicle when the user having the release control apparatus moves away from the electric vehicle.

Technical Solution

In accordance with some embodiments of the present disclosure, a system for controlling locking of an inlet of an electric vehicle, comprises: a release control apparatus configured to transmit a release permission signal or a distance signal; and an inlet control apparatus configured to receive the release permission signal to control the inlet to permit release of a connector of a charging cable connected to the inlet or to receive the distance signal to control the inlet to prohibit release of the connector of the charging cable connected to the inlet when a distance between the electric vehicle and the release control apparatus determined from the distance signal is greater than or equal to a threshold.

In accordance with some embodiments of the present disclosure, an inlet control apparatus for controlling an inlet of an electric vehicle depending on whether or not a release control apparatus approaches, the inlet control apparatus comprises: a control signal communication unit configured to receive a release permission signal or a distance signal from the release control apparatus; and an inlet controller configured to control the inlet to permit a connector of a charging cable connected to the inlet of the electric vehicle to be released when the communication unit receives the release permission signal and to control the inlet to prohibit release of the connector of the charging cable connected to the inlet of the electric vehicle when a distance between the release control apparatus and the electric vehicle determined using the distance signal is greater than or equal to a threshold.

In accordance with some embodiments of the present disclosure, a method for controlling whether or not to permit release of an inlet of an electric vehicle using a release control apparatus, the method comprises: a reception operation of receiving a release permission signal including an identifier of the release control apparatus from the release control apparatus; a determination operation of comparing, when the release permission signal is received, the identifier of the release control apparatus with previously stored identifiers of at least one release control apparatus and determining whether the identifier of the release control apparatus matches any one of the previously stored identifiers of the at least one release control apparatus; and a control operation of controlling the inlet to permit release of the connector of the charging cable connected to the inlet of the electric vehicle when the identifier of the release control apparatus matches any one of the previously stored identifiers.

In accordance with some embodiments of the present disclosure, a method for controlling whether or not to prohibit release of an inlet of an electric vehicle using a release control apparatus, the method comprises: a reception operation of receiving a distance signal from the release control apparatus; a comparison operation of determining a distance between the release control apparatus and the electric vehicle using the distance signal and comparing the distance with a preset threshold; and a control operation of controlling the inlet to prohibit release of a connector of a charging cable connected to the inlet of the electric vehicle when the distance between the release control apparatus and the electric vehicle is greater than or equal to the preset threshold.

Advantageous Effects

As described above, according to one aspect of the present disclosure, the connector of a charging cable is permitted to be released from the inlet of the electric vehicle connected thereto only when a user having a release control apparatus is close to the electric vehicle regardless of whether one end of the charging cable connected to a power source is removed or not and release of the connector of the charging cable from the inlet of the electric vehicle is prohibited when the user having the release control apparatus moves away from the electric vehicle. Thereby, the risk of theft of the charging cable may be significantly reduced even if the owner of the electric vehicle leaves the charging place for a long time.

DETAILED DESCRIPTION

Figure 1:
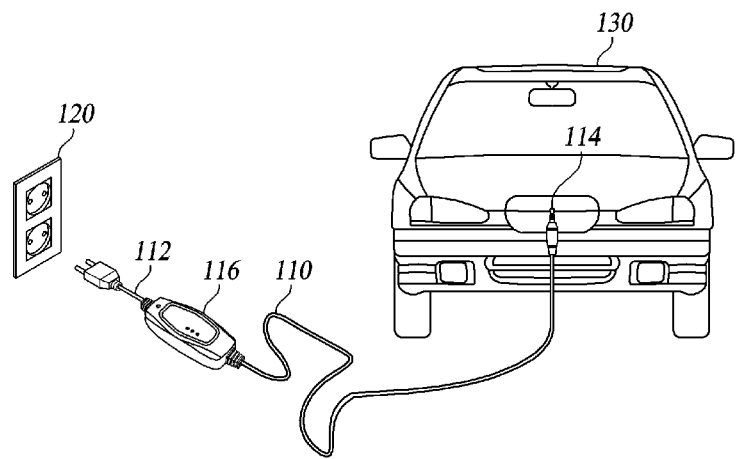
FIG. 1 is a view showing a conventional electric vehicle charging system.

Hereinafter, some embodiments of the present disclosure will be described in detail with reference to the accompanying drawings. In the following description, like reference numerals designate like elements although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, order or sequence of the components. It will be understood that the terms "comprises" and/or "comprising," or "includes" and/or "including" when used in this specification, specify the presence of one or more other components, but do not preclude the presence or addition of one or more other components unless defined to the contrary. If a component were described as 'connected', 'coupled', or 'linked' to another component, they may mean the components are not only directly 'connected', 'coupled', or 'linked' but also are indirectly 'connected', 'coupled', or 'linked' via one or more additional components.

Figure 2:
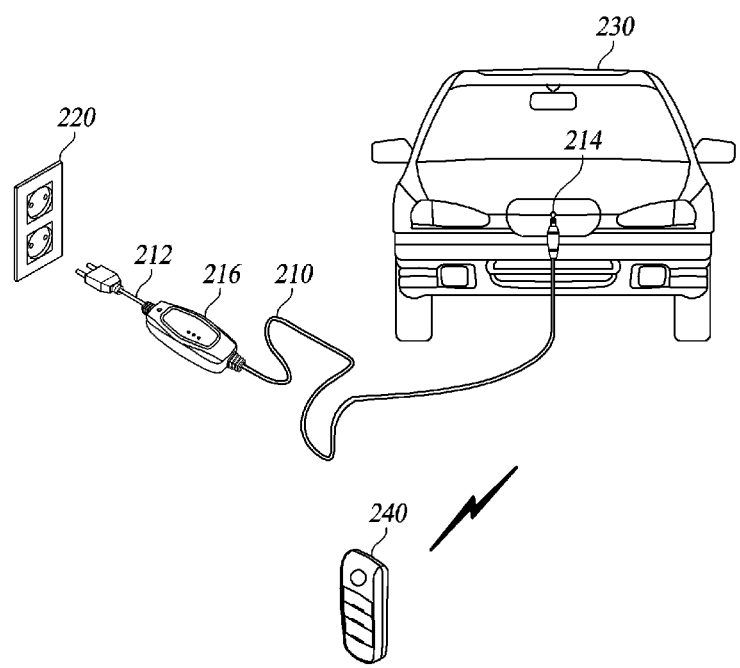
FIG. 2 is a view showing an inlet control system for an electric vehicle according to an embodiment of the present disclosure.

FIG. 2 is a view showing an electric vehicle charging system according to an embodiment of the present disclosure.

Referring to FIG. 2, an electric vehicle charging system according to an embodiment of the present disclosure includes a charging cable 210, a power source 220, an electric vehicle 230, and a release control apparatus 240.

The charging cable 210 has both ends connected to the power source 220 and the inlet 310 of the electric vehicle 230 to transmit electric power to the electric vehicle. One end of the charging cable 210 is implemented as a plug 212 and connected to the power source 220. The other end of the charging cable 210 is implemented as a connector 214. The connector is connected to the inlet 310 of the electric vehicle 230. The charging cable 210 transfers electric power supplied from the power source 220 to the battery of the electric vehicle 230. The charging cable 210 may include an electric vehicle charging cable control apparatus 216 although it can be implemented without the charging cable control apparatus.

The electric vehicle charging cable control apparatus 216 may be positioned in a part of the charging cable 210 and may supply or cut off electric power depending on circumstances when the battery of the electric vehicle 230 is charged. The electric vehicle charging cable control unit 216 serves to provide charging information such as whether charging is currently in progress, whether electric power transmission is interrupted in the event of a fault, and a chargeable capacity.

The electric vehicle 230 refers to all vehicles that use electricity as a power source. The electric vehicle 230 includes not only an electric vehicle (EV) that uses electricity as a whole power source but also a plug-in hybrid electric vehicle (PHEV) that uses electricity as a part of the power source.

The electric vehicle 230 receives a release permission signal including an identifier of the release control apparatus 240 from the release control apparatus 240. The electric vehicle 130 compares the identifier of the release control apparatus 240 included in the release permission signal with previously stored identifiers. When the identifier of the release control apparatus 240 matches any one of the stored identifiers, the electric vehicle performs a control operation to permit the connector 214 of the charging cable to be released from the inlet of the electric vehicle 130 connected thereto. A method for controlling release of the connector of the charging cable from the inlet by the electric vehicle 230 will be described with reference to FIG. 4.

The electric vehicle 230 determines the distance between the electric vehicle 230 and the release control apparatus 240 based on a distance signal received from the release control apparatus 240. When the distance between the electric vehicle 230 and the release control apparatus 240 is greater than or equal to a threshold, the electric vehicle 230 performs a control operation to prohibit the connector 214 of the charging cable from being released from the inlet of the electric vehicle 230 connected thereto.

The electric vehicle 230 may receive a time control signal from the release control apparatus 240. The time control signal refers to a signal for controlling the electric vehicle 230 to maintain the release permitted state only for a preset time in permitting release of the connector 214 of the charging cable from the inlet connected thereto. The time control signal also refers to a signal for controlling the electric vehicle 230 to maintain the release prohibited state only for a preset time in prohibiting the connector 214 of the charging cable from being released from the inlet connected thereto. Upon receiving the time control signal, the electric vehicle 230 may maintain the connector 214 in the release permitted state or the release prohibited state for the time corresponding to the received signal. The elements and operation of the electric vehicle 230 will be described in detail with reference to FIG. 3.

The release control apparatus 240 indirectly controls the inlet to permit or prevent release of the connector 214. The release control apparatus 240 does not directly control the inlet in contrast with the electric vehicle 230, but indirectly controls the inlet by transmitting a release permission signal including the identifier thereof or a distance signal such that the electric vehicle 230 controls release of the connector 214.

The release control apparatus 240 may receive a time control signal from the user of the release control apparatus 240 and transmit the same to the electric vehicle 230. Generally, the user of the release control apparatus 240 is the owner of the electric vehicle 230 or the owner of the electric vehicle charging cable control apparatus 216. The release control apparatus 240 may use a time control signal to perform a control operation to maintain the release permitted state or the release prohibited state of the connector 214 only for the input time. A detailed description of the elements and operation of the release control apparatus 240 will be given with reference to FIG. 5.

While the release control apparatus 240 is illustrated in FIG. 2 as a smart key, embodiments are not limited thereto. Any apparatus having an element capable of transmitting a signal to the electric vehicle 230 may be implemented as the release control apparatus 240. For example, the release control apparatus 240 may be implemented not only with a smart key, but also with a smartphone, a tablet and a laptop computer. The release control apparatus 240 may control transmission of signals to the electric vehicle 130 using software or an application. For example, the release control apparatus 240 may operate software or an application to display, on the display unit of the release control apparatus, an input unit or the like for transmitting a signal, and the user of the release control apparatus may use the input unit or the like to perform a control operation to transmit a signal.

Figure 3:
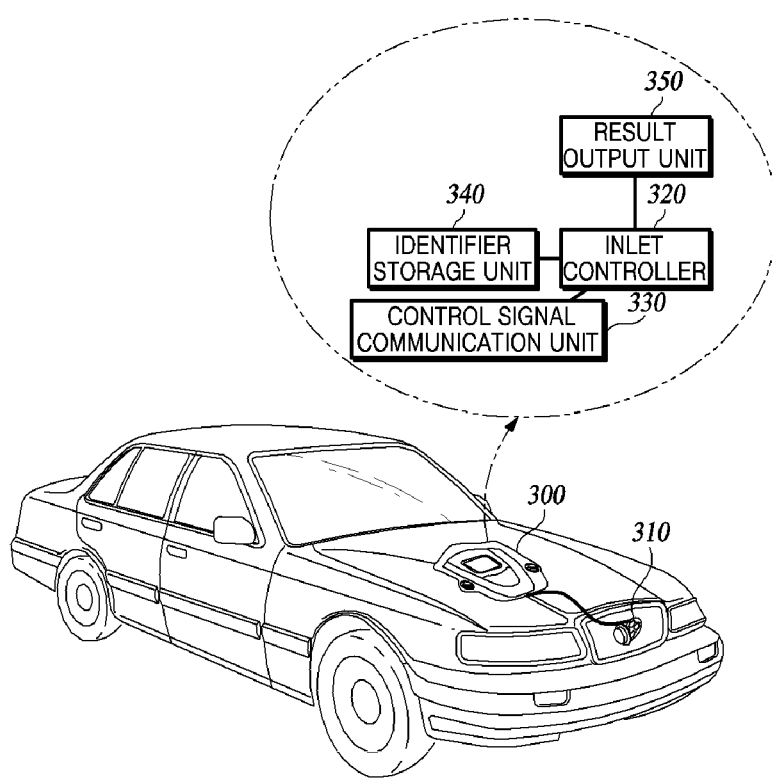
FIG. 3 is a block diagram illustrating the configuration of an inlet control apparatus for an electric vehicle according to an embodiment of the present disclosure.
Figure 4:
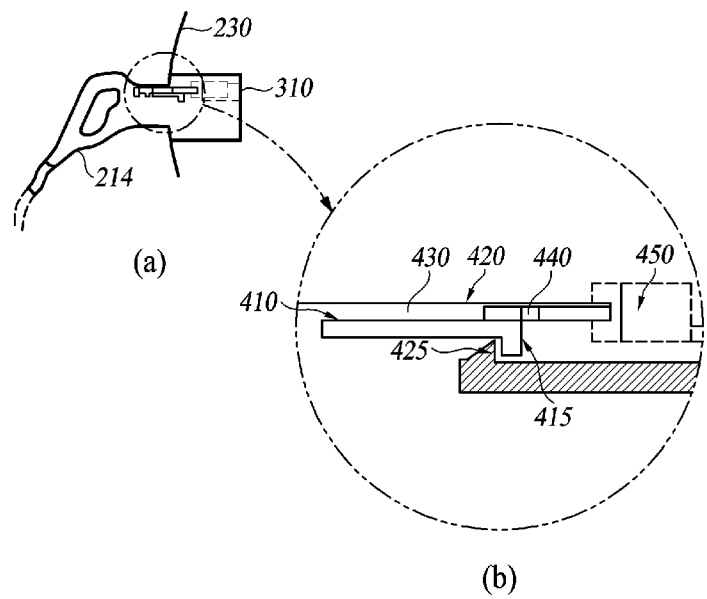
FIG. 4 is a view illustrating a method for controlling release of a connector of a charging cable connected to an inlet of an electric vehicle according to an embodiment of the present disclosure.

FIG. 3 is a block diagram illustrating the configuration of an inlet control apparatus for an electric vehicle according to an embodiment of the present disclosure, and FIG. 4 is a view illustrating a method for controlling release of a connector of a charging cable connected to an inlet of an electric vehicle according to an embodiment of the present disclosure.

The inlet control apparatus 300 according to an embodiment of the present disclosure includes an inlet 310, an inlet controller 320, a control signal communication unit 330, an identifier storage unit 340, and a result output unit 350.

The inlet 310, which is a part that constitutes a vehicle coupler, is attached to the electric vehicle 230 and configured to be connected to the connector 214. Here, the vehicle coupler is a device that enables connection between the charging cable 210 and the electric vehicle 230, and includes the connector 214 attached to the charging cable 210 and the inlet 310 of the electric vehicle. The inlet 310 may conform to the Society of Automotive Engineers (SAE) J1772 standard. This standard is a North American standard for electrical connectors for electric vehicles published by the SAE. The interface of the inlet 310 conforming to this standard may include an AC power source (L1) pin, an AC power source (L2) pin, an apparatus ground pin, a control pilot pin, and a proximity detection pin.

FIG. 4A is a view illustrating the connector connected to the inlet of an electric vehicle and FIG. 4B is an enlarged view of a part of the connector connected to the inlet of the electric vehicle, which illustrates a method for controlling release of the connector from the inlet connected thereto. Hereinafter, a description will be given of a method for controlling release of the connector of a charging cable connected to the inlet of an electric vehicle according to an embodiment of the present disclosure with reference to FIG. 4B.

The connector 214 and the inlet 310 include projections 415 and 425, respectively. As the projections 415 and 425 of the connector and the inlet come into contact with each other, the connector 214 is fixed to the inlet 310. However, the housing 410 of the connector 214 does not come into contact with the outer portion 420 of the inlet, and thus a space 430 is formed between the housing 410 of the connector and the outer portion 420 of the inlet. As the space 430 is formed between the inlet and the connector, the connector can be released from the inlet connected thereto. The inlet of the electric vehicle according to an embodiment of the present disclosure includes a locking device 440 connected to an actuator 450. By positioning the locking device 440 in the space 430 between the inlet and the connector 430, release of the connector is prevented. The actuator 450 moves the locking device 440 in the x-axis direction and determines whether to position the locking device 440 in the space 430 between the inlet and the connector. When the inlet controller 320 permits release of the connector 214, the actuator 450 permits release of the connector 214 by moving the locking device 440 in the positive x-axis direction. When the inlet controller 320 prevents release of the connector 214, the actuator 450 prevents the connector from being released from the inlet connected thereto by moving the locking device 440 in the negative x-axis direction.

The inlet controller 320 determines whether or not to permit release of the connector 214 from the inlet 310 connected thereto by controlling the inlet 310, particularly, the actuator 450. The inlet controller 320 receives a release permission signal from the control signal communication unit 330 and controls the inlet 310 such that the connector 214 can be released. Here, the release permission signal is a signal transmitted wirelessly by the release control apparatus 240, which includes a low frequency (LF) signal or a radio frequency (RF) signal.

Upon receiving a release permission signal including the identifier of the release control apparatus 240 from the control signal communication unit 330, the inlet controller 320 compares the received identifier of the release control apparatus 240 with at least one identifier stored in the identifier storage unit 340. If the identifier of the release control apparatus 240 matches at least one identifier stored in the identifier storage unit 340 as a result of comparison, the inlet controller 320 may control the inlet 310 to enable release of the connector 214 connected to the inlet 310 according to the release permission signal received from the release control apparatus 240.

The inlet controller 320 receives a distance signal from the control signal communication unit 330 and determines the distance between the electric vehicle 230 and the release control apparatus 240. Here, similar to the release permission signal, the distance signal is a signal transmitted wirelessly by the release control apparatus 240, which includes a low frequency (LF) signal or a radio frequency (RF) signal. The inlet controller 320 determines the distance between the electric vehicle 230 and the release control apparatus 240 by determining the received signal strength indication (RSSI) or arrival time of the distance signal. When the distance between the electric vehicle 230 and the release control apparatus 240 is greater than or equal to a threshold, the inlet controller 320 controls the inlet 310 to prohibit release of the connector 214. Here, the threshold means a criterion by which the inlet controller 320 determines whether to permit or prohibit release of the connector 214 connected to the inlet 310.

If the distance between the electric vehicle 230 and the release control apparatus 240 is greater than or equal to the threshold, the owner of the electric vehicle 230 is considered as being out of the charging place while the electric vehicle 230 is being charged. In this case, the inlet controller 320 prohibits release of the connector 214 in order to prevent the charging cable 210 from being stolen. After release of the connector 214 is prohibited, unless the control signal communication unit 330 receives the release permission signal from the release control apparatus 240 again, the inlet controller 320 controls the inlet to prevent the connector 214 from being arbitrarily released from the inlet 310 even if the plug 212 is separated from the power source 220. In this way, the inlet controller 320 controls the inlet 310 to permit only a person having the release control apparatus 240 to release the connector 214 connected to the inlet 310, thereby preventing the inlet cable 210 from being stolen.

The inlet controller 320 may receive a time control signal from the control signal communication unit 330 and control the inlet 310 to maintain the inlet control state for a preset time. For example, upon receiving the time control signal from the control signal communication unit 330 together with a release permission signal including the identifier of the release control apparatus 240, the inlet controller 320 determines whether or not to permit release of the connector 214 by comparing the identifier of the release control apparatus 240 with the identifiers stored in the identifier storage unit 340. If the inlet controller 320 permits release of the connector 214, it may control the inlet to maintain the release permitted state of the connector 214 for the time set in the time control signal. When the inlet controller 320 controls the inlet to maintain the release permitted state, the inlet controller 320 may maintain the release permitted state even if the release control apparatus 240 moves away from the electric vehicle 230 by a distance greater than or equal to the threshold. On the contrary, if the time control signal is received together with the distance signal from the control signal communication unit 330, the inlet controller 320 determines the distance between the release control apparatus 240 and the electric vehicle 230 using the distance signal to determine whether to prohibit release of the connector 214. If release of the connector 214 is prohibited, the inlet controller 320 may control the inlet 310 to maintain the release prohibited state of the connector 214 for the time set in the time control signal. When the inlet 310 is controlled to maintain the release prohibited state, the inlet controller 320 may maintain the release prohibited state even if the release control apparatus 240 transmits a release permission signal including the identifier of the inlet control apparatus 240.

The control signal communication unit 330 receives the release permission signal including the identifier of the release control apparatus 240 from the release control apparatus 240. In addition, the control signal communication unit 330 may receive the distance signal transmitted by the release control apparatus 240.

The control signal communication unit 330 may receive the time control signal from the release control apparatus 240.

The identifier storage unit 340 stores an identifier of at least one release control apparatus capable of controlling the inlet control apparatus of a specific electric vehicle. Upon receiving the release permission signal from the release control apparatus 240 carried by the owner of the electric vehicle 230, the inlet controller 320 should permit the connector 214 to be released from the inlet 310 connected thereto. If the inlet controller 320 permits the connector 214 to be released upon receiving a release permission signal from the release control apparatus 240 carried by a person other than the owner, the charging cable 210 cannot be prevented from being stolen. Accordingly, the identifier storage unit 340 stores the identifier of at least one release control apparatus 240 for controlling the inlet controller 320. Accordingly, the inlet controller 320 controls release of the connector connected to the inlet 310 only when a release permission signal is received from a specific release control apparatus. Here, the identifier may be information such as a serial number of the release control apparatus by which the release control apparatuses can be distinguished from each other.

The result output unit 350 outputs whether or not to permit release of the connector using an optical signal or an acoustic signal. When the inlet controller 320 permits release of the connector 214 through the above-described procedure, the result output unit 350 outputs permission to release to the outside using an optical signal or an acoustic signal. When the inlet controller 320 compares the identifier of the release control apparatus 240 with the identifier stored in the identifier storage unit 340 and determines that the two identifiers are different from each other, the result output unit 350 outputs an optical signal or an acoustic signal to the outside to indicate that the identifiers are different from each other. If the identifiers are different from each other in contrast with the case where the release is permitted, the result output unit 350 may output an optical signal having a higher light intensity or an acoustic signal having a higher volume to the outside.

When the inlet controller 320 prohibits release of the connector 214 connected to the inlet 310 based on the distance signal, the result output unit 350 outputs prohibition of release to the outside using an optical signal or an acoustic signal. Here, the result output unit 350 may output different optical signals or acoustic signals in the case where the connector 214 connected to the inlet 310 is permitted to be released and the case where release is prohibited.

In addition, when the inlet controller 320 maintains the inlet control state for the time determined by using the time control signal, the result output unit 350 may output maintenance of the inlet control state (the release permitted state of the connector or the release prohibited state of the connector) to the outside using an optical signal or an acoustic signal.

Figure 5:
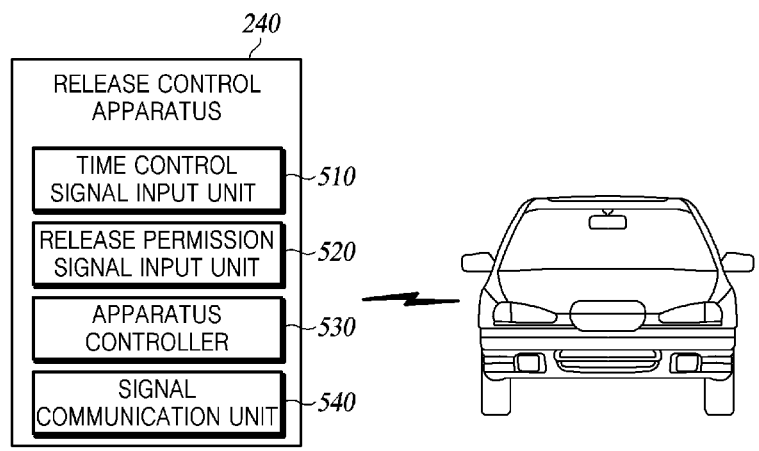
FIG. 5 is a block diagram illustrating the configuration of a release control apparatus according to an embodiment of the present disclosure.

FIG. 5 is a block diagram illustrating the configuration of a release control apparatus according to an embodiment of the present disclosure.

The release control apparatus 240 according to an embodiment of the present disclosure includes a time control signal input unit 510, a release permission signal input unit 520, an apparatus controller 530, and a signal communication unit 540.

The time control signal input unit 510 receives a time control signal from the user of the release control apparatus 240 and transmits the same to the apparatus controller 530. The time control signal input unit 510 may be provided as a separate input unit in the release control apparatus 240 or may be implemented by being displayed on a display unit (not shown) of the release control apparatus 240. For example, when the release control apparatus 240 is a smart key, the time control signal input unit 510 may be implemented as a separate button to receive an increased maintenance time of the inlet control state each time the user of the release control apparatus 240 presses the button. Alternatively, when the release control apparatus 240 is a smartphone or a tablet, the time control signal input unit 510 may be implemented as a separate input unit on the display unit of the smartphone or the tablet using an application to receive an increased maintenance time of the inlet control state each time the user presses the button.

The release permission signal input unit 520 receives the release permission signal from the user of the release control apparatus 240 and transmits the same to the apparatus controller 530. If release of the connector 214 connected to the inlet 310 is necessary when the user of the release control apparatus 240 needs to use the electric vehicle 230, charging of which has been completed or is in progress, the release control apparatus 240 receives input of a release permission signal using the release permission signal input unit 520.

The apparatus controller 530 transmits, to the signal communication unit 540, the release permission signal received from the release permission signal input unit 520 or the time control signal received from the time control signal input unit 510, and controls transmission of a release permission signal or a time control signal of the signal communication unit 540. The release permission signal includes the identifier of the release control apparatus 240.

The signal communication unit 540 transmits the release permission signal or time control signal received from the apparatus controller 530 to the control signal communication unit 330 of the electric vehicle 230.

In addition, the signal communication unit 540 transmits a distance signal to the control signal communication unit 330 of the electric vehicle 230. As the distance signal is transmitted to the signal communication unit 330, the inlet controller 320 of the electric vehicle 230 determines the distance between the release control apparatus 240 and the electric vehicle 230. In this operation, the signal communication unit 540 may transmit, to the control signal communication unit 330, the time control signal received from the time control signal input unit 510 together with the distance signal.

The components included in the inlet control apparatus shown in FIG. 3 and the release control apparatus shown in FIG. 5 are connected to a communication path connecting the respective modules in the corresponding apparatuses. These components communicate using one or more communication buses or signal lines.

Figure 6:
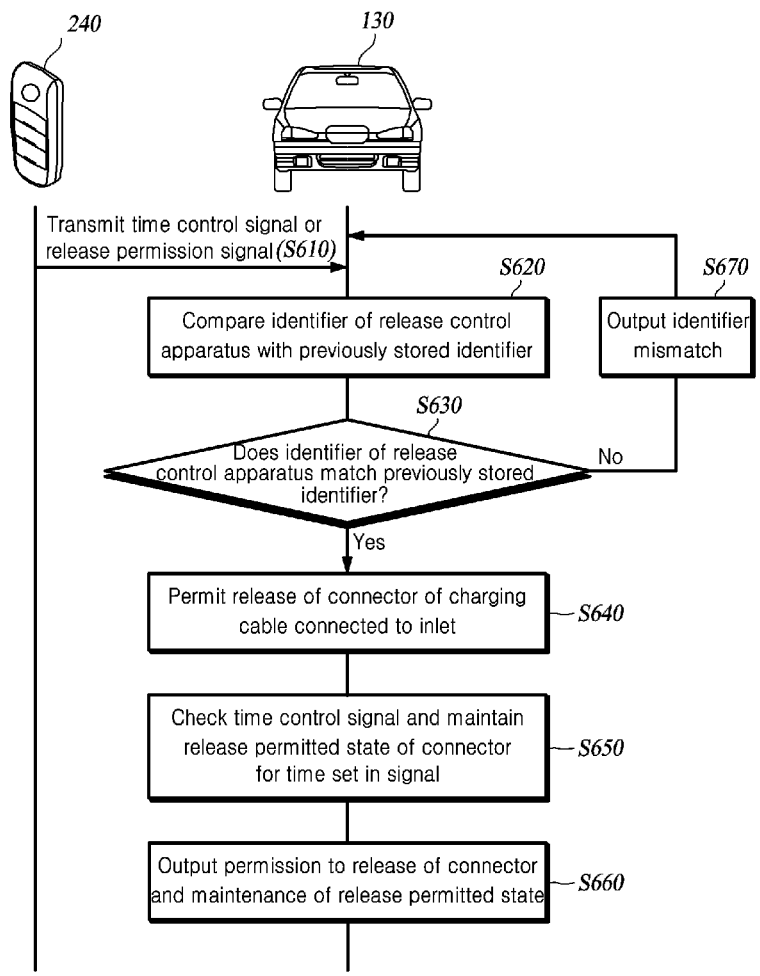
FIG. 6 is a diagram illustrating a method for controlling an electric vehicle according to an embodiment of the present disclosure to permit a connector of a charging cable vehicle to be released from an inlet of the electric vehicle connected thereto.

FIG. 6 is a diagram illustrating a method for controlling an electric vehicle according to an embodiment of the present disclosure to permit a connector of a charging cable vehicle to be released from an inlet of the electric vehicle connected thereto.

The release control apparatus 240 receives a time control signal or a release permission signal from the user of the release control apparatus and transmits the same to the electric vehicle 230 (S610). The time control signal input unit 510 and the release permission signal input unit 520 of the release control apparatus 240 receive the time control signal and the release permission signal from the user of the release control apparatus, respectively, and transmit the same to the apparatus controller 530 of the release control apparatus 240. The apparatus controller 530 of the release control apparatus 240 transfers the time control signal and the release permission signal to the signal communication unit 540. The release permission signal includes an identifier of the release control apparatus 240. The signal communication unit 540 transmits the time control signal or the release permission signal to the control signal communication unit 330 of the electric vehicle 230.

The electric vehicle 230 compares the identifier of the release control apparatus included in the release permission signal with the identifier stored in the electric vehicle (S620). Here, the identifier of a release control apparatus stored in the identifier storage unit 340 corresponds to the identifier of at least one release control apparatus 240 capable of controlling the inlet controller 320 to permit release of the connector 214 using the release permission signal.

The electric vehicle 230 determines whether the identifier of the release control apparatus matches the identifier stored in the electric vehicle (S630). In general, it is common that the user of the release control apparatus 240 matches the owner of the electric vehicle 230. Therefore, in order to prevent the connector 214 from being released by a release permission signal of the release control apparatus of another person while the owner of the electric vehicle 230 does not desire to release the connector 214 connected to the inlet 310, the inlet controller 320 determines whether or not the identifier of the release control apparatus 240 matches the identifier stored in the identifier storage unit 340.

If the identifier of the release control apparatus matches the identifier stored in the electric vehicle, the electric vehicle 230 permits release of the connector connected to the inlet (S640). If the identifier of the release control apparatus 240 matches the identifier stored in stored in the identifier storage unit 340, the inlet controller 320 controls the inlet 310 to enable release of the connector 214. The inlet controller 320 controls the actuator 450 to move the locking device 440 in the space 430 between the inlet and the connector, thereby enabling release of the connector 214 connected to the inlet 310.

The electric vehicle 230 checks the time control signal and maintains the release permitted state of the connector for the time set in the signal (S650). The inlet controller 320 of the electric vehicle 230 may perform a control operation to maintain the inlet control state for the time set in the time control signal. Since the inlet controller 320 has permitted release of the connector 214 through the above-described procedure, the inlet controller 320 may perform a control operation to maintain the release permitted state of the connector 214 for the preset time. When the release permitted state is controlled to be maintained, the inlet controller 320 may maintain the release permitted state even if the release control apparatus 240 moves away from the electric vehicle 230 by a distance greater than or equal to a threshold.

The electric vehicle 230 outputs release permission and maintenance of the release permitted state (S660). The result output unit 350 of the electric vehicle outputs permission to release of the connector 214 connected to the inlet 310 and maintenance of the release permitted state to the outside using an optical signal or an acoustic signal.

If the identifier of the release control apparatus included in the release permission signal does not match the identifier stored in the electric vehicle, the electric vehicle 230 outputs identifier mismatch (S670). The result output unit 350 of the electric vehicle outputs mismatch of the two identifiers to the outside using an optical signal or an acoustic signal.

Figure 7:
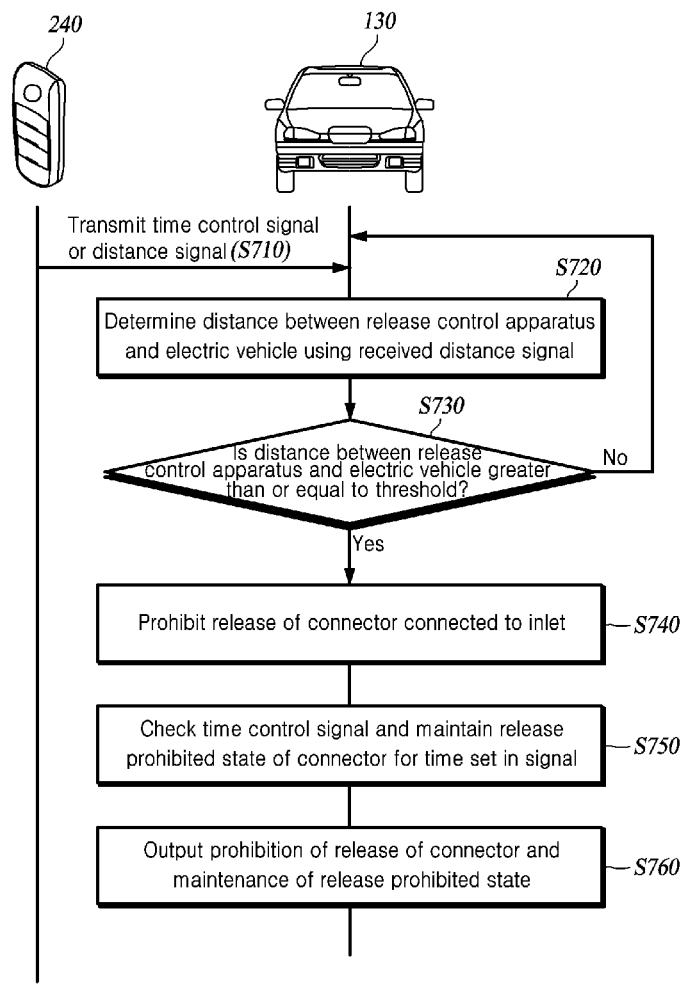
FIG. 7 is a diagram illustrating a method for controlling an electric vehicle according to an embodiment of the present disclosure to prevent a connector of a charging cable from being released from the inlet of the electric vehicle connected thereto.

FIG. 7 is a diagram illustrating a method for controlling an electric vehicle according to an embodiment of the present disclosure to prevent a connector of a charging cable from being released from the inlet of the electric vehicle connected thereto.

The release control apparatus 240 transmits a time control signal or a distance signal to the electric vehicle 230 (S710). The signal communication unit 540 transmits the distance signal to the control signal communication unit 330 of the electric vehicle 130. In addition, the time control signal input unit 510 of the release control apparatus 240 receives the time control signal from the user of the release control apparatus 240 and transmits the same to the signal communication unit 540. The signal communication unit 540 may transmit, to the control signal communication unit 330 of the controller 130, the time control signal together with the distance signal.

The electric vehicle 230 determines the distance between the release control apparatus 240 and the electric vehicle 230 using the received distance signal (S720). The inlet controller 320 determines the distance between the electric vehicle 230 and the release control apparatus 240 using the RSSI or arrival time of the distance signal received by the control signal communication unit 330.

The electric vehicle 230 determines whether the distance between the release control apparatus 240 and the electric vehicle 230 is greater than or equal to a threshold (S730). If the distance between the release control apparatus 240 and the electric vehicle 230 is greater than or equal to the threshold, for example, 5 m, the user of the release control apparatus 240 may be considered as being out of the charging place of the electric vehicle.

If the distance between the release control apparatus 240 and the electric vehicle 230 is greater than or equal to the threshold, for example, 5 m, the electric vehicle 230 prohibits release of the connector 214 connected to the inlet 310 (S740). If the distance between the release control apparatus 240 and the electric vehicle 230 is greater than or equal to the threshold, the inlet controller 320 controls the inlet 310 to prohibit release of the connector 214 connected to the inlet 310 in order to prevent the charging cable 210 from being stolen. The inlet controller 320 controls the actuator 450 to move the locking device 440 to the space 430 between the inlet and the connector to prohibit release of the connector 214 connected to the inlet 310.

The electric vehicle 230 checks the time control signal and maintains the release prohibited state of the connector for the time set in the signal (S750). The inlet controller 320 of the electric vehicle 230 may perform a control operation to maintain the inlet control state for the time set in the time control signal. Since the inlet controller 320 has prohibited release of the connector 214 through the above-described procedure, the inlet controller 320 may perform a control operation to maintain the release prohibited state of the connector 214 for the preset time. When the release prohibited state is controlled to be maintained, the release control apparatus 240 may maintain the release prohibited state even if the release control apparatus 240 transmits a release permission signal together with the identifier of the release control apparatus 240.

The electric vehicle 230 outputs prohibition of release of the connector 214 connected to the inlet 310 and maintenance of the release prohibited state (S760). If release of the connector 214 connected to the inlet 310 is prohibited by the inlet controller 320, the result output unit 350 of the electric vehicle 210 outputs prohibition of release of the connector 214 connected to the inlet 310 and maintenance of the release prohibited state to the outside using an optical signal or an acoustic signal.

Steps S610~S670 and Steps S710~S760 are described to be sequentially performed in FIG. 6 and FIG. 7 as a mere example for describing the technical idea of some embodiments, although one of ordinary skill in the pertinent art would appreciate that various modifications, additions and substitutions are possible by performing the sequences shown in FIG. 6 or FIG. 7 in a different order or at least one of steps in parallel without departing from the idea and scope of the embodiments, and hence the example shown in FIG. 6 or FIG. 7 are not limited to the chronological order.

The steps shown in FIG. 6 or FIG. 7 can be implemented as a computer program, and can be recorded on a non-transitory computer-readable medium. The computer-readable recording medium includes any type of recording device on which data that can be read by a computer system are recordable. Examples of the computer-readable recording medium include a magnetic storage medium (e.g., a floppy disk, a hard disk, a ROM, USB memory, etc.), an optically readable medium (e.g., a CD-ROM, DVD, Blue-ray, etc.) and carrier waves (e.g., transmission through the Internet). Further, an example computer-readable recording medium has computer-readable codes that can be stored and executed in a distributed mode in computer systems connected via a network.

Although exemplary embodiments of the present disclosure have been described for illustrative purposes, those skilled in the art will appreciate that various modifications, additions and substitutions are possible, without departing from the spirit and scope of the claimed invention. Accordingly, one of ordinary skill would understand the scope of the claimed invention is not to be limited by the explicitly described above embodiments but by the claims and equivalents thereof.

CROSS-REFERENCE TO RELATED APPLICATION

If applicable, this application claims priority under 35 U.S.C § 119(a) of Patent Application No. 10-2015-0180973, filed on Dec. 17, 2015 in Korea, the entire content of which is incorporated herein by reference. In addition, this non-provisional application claims priority in countries, other than the U.S., with the same reason based on the Korean patent application, the entire content of which is hereby incorporated by reference.

The invention claimed is:

1. A system for controlling locking of an inlet of an electric vehicle, comprising:
   a release control apparatus configured to transmit a release permission signal or a distance signal; and
   an inlet control apparatus configured to receive the release permission signal to control the inlet to permit release of a connector of a charging cable connected to the inlet or to receive the distance signal to control the inlet to prohibit release of the connector of the charging cable connected to the inlet when a distance between the electric vehicle and the release control apparatus determined from the distance signal is greater than or equal to a threshold;
   wherein the release control apparatus transmits a time control signal together with the release permission signal or the distance signal; and
   wherein the inlet control apparatus maintains a current inlet control state for a time determined using the time control signal.

2. The system of claim 1, wherein the release control apparatus transmits the release permission signal including an identifier of the release control apparatus or the distance signal.

3. The system of claim 2, wherein the inlet control apparatus performs a control operation to permit release of the connector of the charging cable connected to the inlet of the electric vehicle only when the identifier of the release control apparatus matches a previously stored identifier.

4. The system of claim 1, wherein the inlet control apparatus controls release of the connector of the charging cable connected to the inlet by controlling an actuator present in the inlet.

5. An inlet control apparatus for controlling an inlet of an electric vehicle depending on whether or not a release control apparatus approaches, the inlet control apparatus comprising:
   a control signal communication unit configured to receive a release permission signal or a distance signal from the release control apparatus; and
   an inlet controller configured to control the inlet to permit a connector of a charging cable connected to the inlet of the electric vehicle to be released when the control signal communication unit receives the release permission signal and to control the inlet to prohibit release of the connector of the charging cable connected to the inlet of the electric vehicle when a distance between the release control apparatus and the electric vehicle determined using the distance signal is greater than or equal to a threshold;
   wherein the release control apparatus transmits a time control signal together with the release permission signal or the distance signal; and
   wherein the inlet control apparatus maintains a current inlet control state for a time determined using the time control signal.

6. The inlet control apparatus of claim 5, wherein the control signal communication unit receives the release permission signal including an identifier of the release control apparatus or the distance signal.

7. The inlet control apparatus of claim 6, further comprising:
   an identifier storage unit configured to store identifiers of at least one release control apparatus capable of controlling the inlet controller to permit release of the connector connected to the inlet of the electric vehicle.

8. The inlet control apparatus of claim 7, wherein the inlet controller performs a control operation to permit release of the connector of the charging cable connected to the inlet of the electric vehicle only when the identifier of the release control apparatus received by the control signal communication unit matches any one of the identifiers of the at least one release control apparatus stored in the identifier storage unit.

9. A method for controlling whether or not to permit release of an inlet of an electric vehicle using a release control apparatus, the method comprising:
   a reception operation of receiving a release permission signal including an identifier of the release control apparatus from the release control apparatus, the reception operation further includes receiving a time control signal together with the release permission signal;
   a determination operation of comparing, when the release permission signal is received, the identifier of the release control apparatus with previously stored identifiers of at least one release control apparatus and determining whether the identifier of the release control apparatus matches any one of the previously stored identifiers of the at least one release control apparatus;
   a control operation of controlling the inlet to permit release of the connector of the charging cable connected to the inlet of the electric vehicle when the identifier of the release control apparatus matches any one of the previously stored identifiers; and
   a maintenance operation of performing a control operation to maintain a control state of the inlet for a time determined using the time control signal when the inlet is controlled to permit release of the connector of the charging cable through the control operation.

10. A method for controlling whether or not to prohibit release of an inlet of an electric vehicle using a release control apparatus, the method comprising:
   a reception operation of receiving a time control signal together with a distance signal from the release control apparatus;
   a comparison operation of determining a distance between the release control apparatus and the electric vehicle using the distance signal and comparing the distance with a preset threshold;
   a control operation of controlling the inlet to prohibit release of a connector of a charging cable connected to the inlet of the electric vehicle when the distance between the release control apparatus and the electric vehicle is greater than or equal to the preset threshold; and
   a maintenance operation of performing a control operation, when the inlet is controlled to prohibit release of the connector of the charging cable through the control operation, to maintain a control state of the inlet for a time determined using the time control signal.

* * * * *